E. R. MULLETT.
Packing and Putting up Rubber in Sheets for Dental and other Uses.
No. 208,484.　　　　　　Patented Oct. 1, 1878.
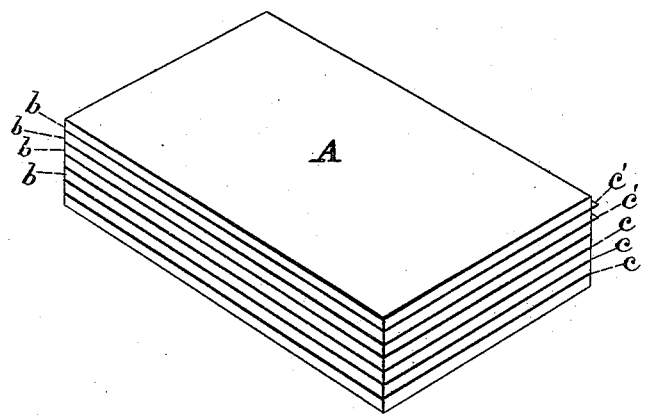
Witnesses:
H. A. Daniels.
E. P. Goodwin.
Inventor:
Eugene R. Mullett
By W. Burris
Attorney.

ns and of the usual thickness; and a

UNITED STATES PATENT OFFICE.

EUGENE R. MULLETT, OF CLINTON, IOWA.

IMPROVEMENT IN PACKING AND PUTTING UP RUBBER IN SHEETS FOR DENTAL AND OTHER USES.

Specification forming part of Letters Patent No. 208,484, dated October 1, 1878; application filed August 7, 1878.

*To all whom it may concern:*

Be it known that I, EUGENE R. MULLETT, of Clinton, in the county of Clinton and State of Iowa, have invented certain new and useful Improvements in the Process of Packing and Preserving Rubber in Sheets previous to its being Vulcanized; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The drawing represents a perspective view of a package of unvulcanized rubber sheets, having between them sheets of tin-foil.

My invention relates to an improved method of packing unvulcanized rubber, mainly for dental purposes.

Heretofore, in putting up this rubber in suitable packages for sale, shipment, or storage, layers of cloth have been placed between the sheets of rubber to prevent them from adhering together. It is found in practice, however, that when thus prepared the rubber adheres so firmly to the cloth as to leave on the rubber portions of the lint, starch, or sizing of the cloth, which injures the rubber when vulcanized. To avoid this difficulty, I place sheets of tin-foil or other non-adhesive substance between the sheets of rubber, as hereinafter described, and as shown in the drawing.

A represents a package of unvulcanized rubber, of conveniently-sized sheets $b$, separated by sheets of tin-foil C. It is evident the sheets and the packages may be of any required size and weight.

The drawing represents a package of sheets of about two and one-half by four and one-half inches, and of the usual thickness; and a package containing twenty-one of such sheets weighs about one pound.

In preparing the rubber for the packages, large sheets may be placed on correspondingly large sheets of the tin-foil, and both cut together; but I prefer to have the tin-foil sheets slightly larger than the sheets of rubber, as shown at $c'$ on the drawing, and to secure this the sheets of rubber and the sheets of tin-foil must be cut separately. Sheet lead, oil silk, or other nonadhesive material may be used; but I prefer the tin-foil.

I am aware of the patent to L. O. P. Myer, dated April 4, 1854, which describes the use of tin-foil for preserving the rubber during the process of heating; but in that process a single sheet of rubber was inclosed in the tin-foil preparatory to placing it in the mold. He does not mention or in any way allude to the putting up of rubber in packages, and of course does not describe my method of placing tin-foil between the sheets of rubber composing such a package; and I do not claim the use of tin-foil in the manner described in said patent; but What I do claim, and desire to secure by Letters Patent, is—

Unvulcanized rubber, in sheets of suitable size, put up in packages of convenient size and weight for sale, shipment, and storage, having sheets of tin-foil or its equivalent placed between the sheets of rubber to prevent them from adhering together, substantially as and for the purposes described.

In testimony that I claim the foregoing as my own invention I affix my signature hereunto in presence of two witnesses.

EUGENE RUBEN MULLETT.

Witnesses:
W. W. SANBORN,
J. H. FLINT.